United States Patent [19]

Gallagher

[11] 4,287,756

[45] Sep. 8, 1981

[54] STRATIFIED FLUID INTERFACE RECORDER

[76] Inventor: John J. Gallagher, 1000 Connecticut Ave., NW #1103, Washington, D.C. 20036

[21] Appl. No.: 87,737

[22] Filed: Oct. 24, 1979

[51] Int. Cl.³ .................. G01F 23/00; G01F 23/24
[52] U.S. Cl. ......................... 73/61.1 R; 73/290 R; 73/293; 73/304 R
[58] Field of Search ........... 73/61.1 R, 290 R, 304 R, 73/304 C, 293; 340/620

[56] References Cited

U.S. PATENT DOCUMENTS 3,942,374  3/1976  Glenn .................. 73/61.1 R
4,213,340  7/1980  Cheng .................. 73/304 R Primary Examiner—James J. Gill

[57] ABSTRACT

A device for determining the relative properties of stratified fluids, such as the interface between oil and water having plural fluid character recording stations with sensors on an elongated member. Means are provided to clear the recording stations to preclude contamination of the sensors by fluid from other strata.

11 Claims, 7 Drawing Figures

STRATIFIED FLUID INTERFACE RECORDER

BACKGROUND OF THE INVENTION

This invention pertains generally to gauging devices for fluids and more particularly to a device for determining the location of the interface between stratified liquids of different character such, for example, as oil and water.

In gauging tanks holding liquids such as petroleum by ullage readings it is difficult to determine with any certainty the quantity of that liquid if water is also present or likely to be present in a stratified area beneath the liquid. Such may occur if the liquid has been subject to contamination by water or, most importantly, where a vessel has been involved in a casualty involving penetration of a petroleum cargo or fuel tank with attendant ingress of water into that tank. In such cases it is very important to quickly determine the quantities of petroleum remaining to ascertain both the amount lost for pollution control planning and the amount remaining for emergency off loading requirements.

Since, due to their relative densities, petroleum and water will stratify with water layered beneath the petroleum, some means must be provided to remotely sense the quality of water underlying the petroleum. This has been accomplished in the past by means of electronic sensors which detect the differing character of petroleum and water by sensing their differing electrical conductance characteristics. By lowering the device through the petroleum into the water, the interface between the two liquids can be determined by noting the point of deployment of the sensor at which the electrical conductance changes. Such devices work well so long as the petroleum is relatively light and of low viscosity. When the petroleum, however, is heavy and viscous such as would be the case with a cold or cooling #6 residual fuel oil, the above sensor would not be suitable since it would be coated by the viscous oil as it is passed through it and be therefore incapable of sensing the changed character of the water once it passes through the interface. In attempts to avoid this problem, where a tank vessel with a holed fuel tank was awaiting drydocking, a probe was lowered to the bottom of the holed tank through viscous oil while immersed in a container of water and subsequently raised out of the container and through the interface in an attempt to detect the change in conductivity on the way back through. Although extreme care was exercised and the attempt repeated several times, no success was experienced in so locating the interface.

SUMMARY OF THE INVENTION

This invention provides a device for determining the interface between stratified fluids of different character regardless of the viscosity characteristics of either of the fluids thereby avoiding the disadvantages of the prior art.

The invention also provides a device for making determinations of fluid interface in situations such for example, as in submerged vessels where prior art devices would be difficult to implement.

In the preferred embodiment, this invention provides a device for determining the interface of stratified fluids having a core with plural fluid character recording stations at intervals along the length thereof and an enclosing sheath with opening means adapted to selectively expose the recording stations to the ambient such that the device may be removed from and/or inserted into position through the fluid with exposure to the recording stations blocked by said opening means while the character of the stratified liquids is recorded at each station by exposure of the stations while the device is in place.

These and the other objects and attendant advantages of this invention will become better understood to those skilled in the art by reference to the following detailed description when viewed in light of the accompanying drawings where in like components throughout the figures are indicated by like numerals and wherein:

BRIEF DESCRIPTION OF THE DRAWINGS

Turning now to FIG. 1, a probe, generally indicated at 10, is composed of a core 12 substantially enclosed by means consisting of a sheath 14. The core 12 has fluid character recording stations 16a through 16m disposed therealong to record the character of fluid to which that station may be exposed. In this manner, with the probe inserted into stratified fluids of differing character, the recording stations at each level can reveal the character of the fluid at that level. Depending on the intended use, the spacing of the stations 16 can vary from several feet to a substantially abutting disposition. For the purpose of detecting the oil water interface in tank vessel casualties, a spacing of from 3 to 6 inches would be adequate.

Figure 1:
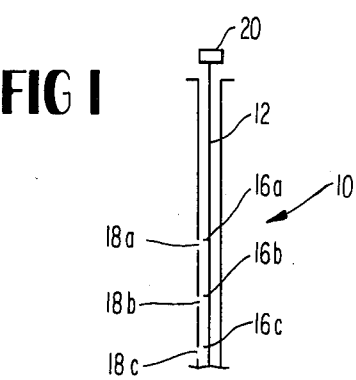
FIG. 1 is a general schematic view of a device incorporating the features of the invention.

The recording stations can be of any type suitable for the purpose and compatible with the environment. They can be sensors such, for example as capacitors to sense the electrical properties of the fluid, chemical reagents such as "water finder" paste to sense the chemical properties of the fluid or fiber optic connected viewing ports to sense the optical characteristics of the fluid or they can be collectors such as ported chambers for sampling the fluid for subsequent determination of the characteristics.

The sheath 14 is moveably disposed around the core 12 and is provided, in the illustrated generalized embodiment, with a series of ports 18a through 18m corresponding to and positioned adjacent in the Figure, to the stations 16a through 16m. In the relative position of the core 12 to the sheath 14 shown, the sheath body blocks exposure of the stations 16a through 16m to protect the stations from contamination during transit of the probe through the fluid to be analyzed during insertion and withdrawal of the probe. By movement of the core 12 downwardly to a second position where the stations 16a through 16m are aligned with the ports 18a through 18m (not shown), each of the stations is exposed to the ambient fluid for recordation of the characteristics thereof. As will be described in greater detail herein below, the movement of the core 14 with respect to the sheath 16 can be other than linear as shown and may be rotary, helical or otherwise if so desired.

A handle 20 serves as actuating means to affect the required movement of the core 12 with respect to the sheath 14.

Figure 2:
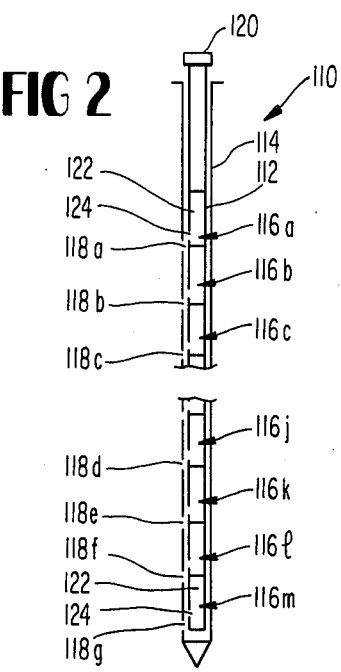
FIG. 2 is a schematic view of one variation of a device in accordance with the invention.

In FIG. 2, a specific embodiment featuring sampling chambers in accordance with the invention is illustrated. In this embodiment, components thereof corresponding to like components of the generalized schematic of FIG. 1, are indicated by like numerals of the next higher order. In the Figure, the probe, indicated at 110 comprises a sheath 114 movably enclosing a core 112. The core 112 contains plural fluid character recording stations along the length thereof generally indicated at 116a through 116m. Each station comprises a hollow chamber 122 communicating with the exterior of the core 112 through an orifice 124. Ports 118a through 118m corresponding to stations 116a through 116m are formed in the sheath 114 and disposed adjacent, in the Figure, to the respective orifice 124 for the station to which it corresponds. In the position illustrated, the sheath blocks communication to each of the chambers 122 to isolate the chambers from the surrounding fluid during transit through the fluid when the probe is inserted in or removed from the fluid to be analyzed. By movement of the core 112 downwardly to a second position within the sheath (not shown), the ports 118a through 118g are aligned with their respective orifices so that communication between each of the chambers 122 and the ambient fluid can be affected when the probe is in correct position for analysis. A handle 120 provides means to actuate the core 112 between the first position illustrated and the second positon where communication is furnished to each chamber. When the probe 110 is in proper position and the core 112 actuated to align each of the ports 118a through 118m with the correspondigng orifices 124, ambient fluid flows into each submerged chamber 122. By actuating the core to misalign the ports and orifices as is shown in FIG. 2, the chambers 122 are resealed and the probe can be removed for examination of the fluid in the chambers without recontamination. "O" rings, packing or other sealing means (not shown) can be utilized to provide proper sealing between the core 112 and sheath 114 as is common in the art. In the event the fluid to be analysed is too viscous to insure adequate flow into the opened chambers, pistons (not shown) could be disposed in each chamber immediately above the orifices 124 and actuated upwardly by means such as a pull wire or rod (not shown) connected through and to each piston to affect positive displacement of fluid into each chamber. A bleed port (not shown) from the upper area of each chamber 122 may be required if such a variation is found necessary.

Figure 3A:
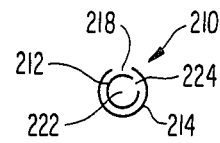
FIG. 3A is a sectional view of a variation of the embodiment of FIG. 2 in a first position.
Figure 3B:
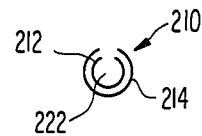
FIG. 3B is a view similar to FIG. 3A showing a second position of the embodiment of FIG. 2.

FIGS. 3A and 3B illustrate a variation of the embodiment of FIG. 2 and, as above, like components are indicated by the same numeral only of the next higher order. The primary distinction of the embodiment of FIGS. 3A and 3B is the direction of actuation of movement of the core 212 within the sheath 214. As is seen in FIG. 3A, the orifice 224 is rotationally misaligned with the port 218. By rotating the core 212 counterclockwise (or the sheath clockwise) the orifice 224 and port 218 are aligned as seen in FIG. 3B and communication is afforded to the chamber 222. In this embodiment, to simplify the structure, the port 218 may be a single or a series of vertical slots rather than individual ports as illustrated in the preceeding Figures.

Figure 4:
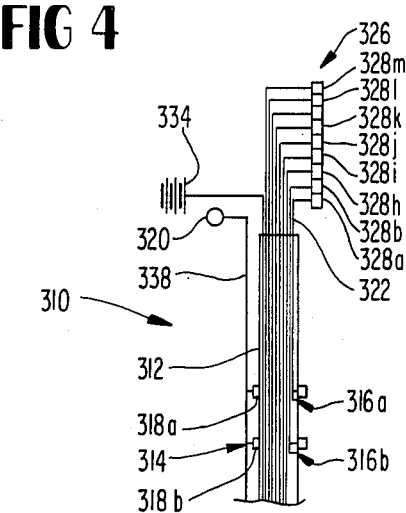
FIG. 4 is a schematic view of another variation of a device constructed in accordance with the invention.

In FIG. 4, a variation in the invention of the type incorporating "sensors" is illustrated. Again components of this embodiment corresponding to those of the preceeding embodiments are indicated by like numerals only of a still higher order. As indicated above, the invention may utilize sensors of different kinds including electrical, chemical or optical sensors. In the embodiment illustrated here, sensors of the optical type are specifically disclosed. It should be understood that the general system disclosed could incorporate the other types of sensor systems by appropriate substitution of elements such as sensors, conductors and the like.

In FIG. 4, the probe 310 comprises a core 312 having plural recording stations, indicated generally at 316a through 316m, therealong. The recording stations each comprise an optical window 324 in the wall of the core 312 connected to an optical array 326 by a fiberoptic conductor 322. Transmission of light by fiberoptics (fine "light tubes" comprising a translucent core of one refractive index coated with a sheath of similar material having different refractive index) is now in common use in the art for transmission of signals of all kinds. By this arrangement, light sensed at any of the stations 316a through 316m is transmitted separately to the array 326 through the fiberoptic conductor 322 to the array 326. The array preferably comprises a display unit 328a through 328m for each recording station 316a through 316m laid out and coded to readily identify the stations receiving light. A light source 330 connected through a conductor 332 to a battery 334 provides illumination, if needed, in the fluid when analysis thereof is required. The light source 330 is disposed within a collar of transparent material 336 of equal diameter to the exterior of the core 312. A wiper system, generally indicated at 314 surrounds the core 312 and comprises a series of wiper rings 318a through 318n, the ring 318a through 318m positioned proximate to and corresponding with each of the windows 324 of the recording stations 316a through 316m while the wiper ring 318n is positioned over the collar 336. The wiper rings are interconnected by a pull rod 338 and handle 320 so that by upward actuation of the handle the light source 330 is uncovered and the optical windows 324 are simultaneously wiped clean. Obviously conventional sheaths, as described above, a series of blocking rings positionable over each window and simultaneously moveable to clear the windows or a vertical wiper blade or blades corresponding to the vertical slot described above could be substituted for the device specifically described. With the system described, the probe 310 is inserted into position in the fluids to be analysed. Assuming the fluids are heavy #6 oil stratified over water, the windows 324 of the recording stations 316 which extend into the water strata can be sufficiently coated with the #6 oil during passage through the oil strata that light cannot be transmitted therethrough. Actuation of the wiper rings 318 through 318n serves to positively clear the windows so that those remaining in the water strata will transmit light and so that the light source 330 is cleared to emit light. The interface of oil and water then can be determined by energizing the light source and observing the location of stations transmitting light to the array 326. In fluids not sufficiently different in optical character to enable a visual determination of different character by translucense or color, the light transmitted to each display unit 328 could be analysed by an instrument such, for example, as a spectrometer to determine differences or composition of the fluids. This would be particularly valuable in analysing stratified gasses.

Figure 5:
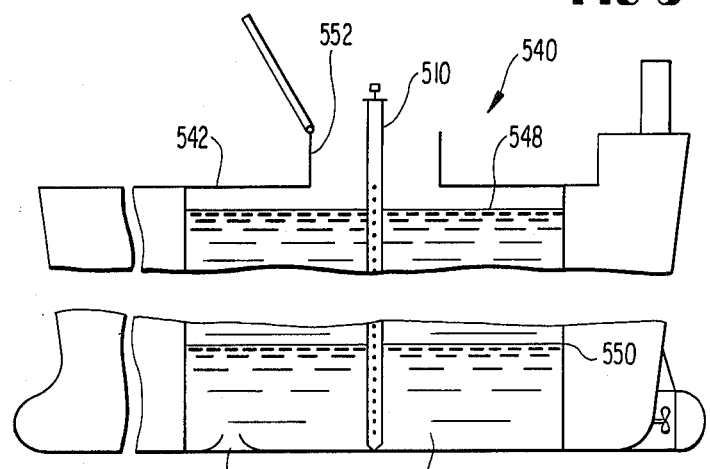
FIG. 5 is a schematic fragmentary view of a tank vessel demonstrating the operation of an embodiment in accordance with the invention.

In FIGS. 5 one of the uses of a device in accordance with the invention is illustrated. In this instance, a tankvessel indicated at 540, has holed one of its cargo tanks 542 at 544. Water 546 has intruded into the tank 542 replacing a portion of the oil cargo 548 and stratifying beneath it with an interface at 550. The problem is to determine the quantity of oil remaining in the tank so that adequate offloading systems can be employed and/or the time required to offload the tank 542 and eliminate a pollution hazard can be ascertained. The normal method would be to measure the "ullage" (i.e. the distance between the top of the tank 542 and the surface of the cargo). Since a volumn of the tank 542 is, however, occupied by water, it will be also necessary in this case to locate the height of the interface 550 and subtract the volumn indicated thereby from the volumn indicated by the ullage reading. This is done by inserting a probe 510 in accordance with the invention through an access 552 and through the interface 550 as illustrated and actuating it to locate the interface according to one of the methods described above.

Figure 6:
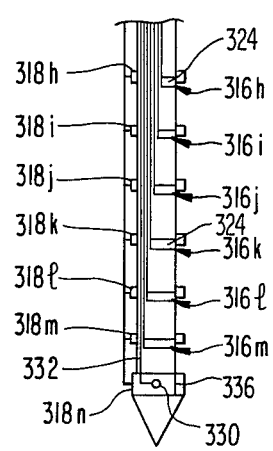
FIG. 6 is a schematic sectional view illustrating the operation of a device in accordance with the invention on a sunken tankvessel.

In FIG. 6 another use of a device in accordance with the invention is illustrated. In this case, a sunken tankvessel 640 requires offloading to eliminate a pollution hazard. It is necessary to determine which tanks and/or in what quantities must be offloaded. In the illustration a starboard wing tank 642s is shown filled with oil 648, the center tank 642c partially filled with water 646 beneath a strata of oil 648 and a port wing tank 642p filled with water 646.

Tank vessels can be offloaded from submerged locations through procedures such as diver installed "hot taps" as described in detail in the salvage reports on the sunken tanker ARROW (US Navy Report 0994-LP-008-1010). In this procedure, flanged valves with spools are attached to the tanks and holes are drilled with drilling or hole cutting machines through the hull or deck, as appropriate, to provide access to the tank. With the drill or hole cutter retracted, the valve is closed, the machine removed and hoses or manifolds attached so that, with the valve reopened, the contents of the tank may be pumped out. Such procedures are complex, time consuming and expensive and it would be of extreme importance if some means could be provided to ascertain, in advance, the contents of each tank to preclude unnecessary hot tapping and to estimate the capacities and/or offloadng times which may be required in a given operation. In the illustration, spool pieces 652 with appropriate valving and packing have been attached to the tank vessel deck over each of the tanks thereof for purposes of providing access for examination of the contents of the tanks. The spool piece 652 may be a reduced version of the flanged spool piece and valve of the hot tap process referred to above or may comprise a simple flange with packing and some sort of cap to preclude leakage after examination if the tank examined should contain oil. In operation, divers would attach spool pieces to the tank tops as shown and each tank would be drilled through the spool piece and examined with a probe 610 in accordance with one of the processes described above. The presence or absence of oil and/or the quantities present would thereby be determined for each tank and recorded for subsequent offloading where necessary, by a hot tap or other procedure. Where oil is indicated present in sufficient quantities for offloading, the spool piece 652 is closed or capped and that tank is scheduled for offloading. Spool pieces on tanks where little or no oil is indicated as present can also be closed or capped if desired for subsequent checking in the event the attitude of the wreck should shift or there may be some other danger of ingress of oil into that area through common tanks or structural damage to the vessel during operations.

What has been set forth above is intended as exemplary of a teaching in accordance with the invention to enable those skilled in the art to practice it. It should therefore be understood that, within the scope of the appended, the invention may be practiced other than as specifically described.

What is new and desired to be protected by Letters Patent of the United States is:

1. A device for determining the relative location of stratified fluids of different character when inserted through the stratified fluids comprising:
   an elongated member having plural fluid character recording stations disposed therealong;
   sensing means associated with each of said stations for determining the properties of the fluid proximate thereto when said probe is positioned through said fluids;
   clearing means movably associated with each of said sensing means to preclude contamination thereof by fluid from other strata; and
   means to determine the fluid characteristics recorded by said stations.

2. A device in accordance with claim 1 wherein said recording stations comprise optical windows in said member and wherein said means to determine the fluid characteristics comprise filber-optic conductors connected to each of said windows at one end to a remote recording station at the other end for remote determination of the properties of said fluids;
   said device further comprising a light source associated with said member to provide illumination for determination of the properties of said fluids where required.

3. A device in accordance with claim 1 wherein said recording stations comprise independent chambers formed in said member and wherein said sensing means comprises individual ports communicating with said chambers.

4. A device in accordance with claim 1 wherein said clearing means comprises means to block said sensing means in a first position when said member is transiting said fluids and to unblock said sensing means when moved to a second position to provide for recordation of the characteristics of said fluids.

5. A device in accordance with claim 3 wherein said means to block comprises a sheath movably enclosing said elongated member, said sheath having orifice means therethrough movable from said first position with said orifice means out of alignment with said sensing means to a second position with said orifice means aligned with said sensing means.

6. A device in accordance with claim 4 wherein said orifice means comprises a port corresponding to each of said sensing means.

7. A device in accordance with claim 3 wherein said means to block comprises covering means movable from a first position with said sensing means in alignment therewith to cover said sensing means to a second position with sensing means out of alignment therewith to uncover said sensing means.

8. A device in accordance with claim 1 wherein said clearing means comprises wiping means movable between a first position adjacent one side of said sensing means to a second position adjacent to the other side of said sensing means to thereby wipe said sensing means clear of any contaminant prior to recordation of the characteristics of said fluid.

9. A device in accordance with claim 8 wherein said wiping means comprises a wiping ring in wiping contact with said elongated member proximate each of said sensing means, and connecting means to simultaneously move said rings from said first position to said second position.

10. A device in accordance with claim 1 wherein movement of said clearing means is rotary of said member.

11. A device in accordance with claim 1 wherein movement of said clearing means is longitudinal of said member.

* * * * *